United States Patent [19]
Hyun

[11] B 3,985,847
[45] Oct. 12, 1976

[54] METHOD FOR THE EXTRUSION OF FOAM SHAPES

[75] Inventor: Kun Sup Hyun, Midland, Mich.

[73] Assignee: The Dow Chemical Company, Midland, Mich.

[22] Filed: Sept. 23, 1974

[21] Appl. No.: 508,369

[44] Published under the second Trial Voluntary Protest Program on January 13, 1976 as document No. B 508,369.

[52] U.S. Cl. ................................. 264/51; 264/53; 264/54; 264/210 R; 264/280; 264/295; 264/321; 264/339
[51] Int. Cl.² ................... B29D 27/00; B29F 3/00
[58] Field of Search ............... 264/45.5, 46.1, 179, 264/210 R, 295, DIG. 66, 151, 176 R, 51–54, 321, 339, 280

[56] References Cited
UNITED STATES PATENTS

| | | |
|---|---|---|
| 3,258,515 | 6/1966 | Brown .............................. 264/167 |
| 3,426,111 | 2/1969 | Simpson ............................ 264/51 |
| 3,795,729 | 3/1974 | Asakura et al. .................... 264/46.1 |

*Primary Examiner*—Willard E. Hoag
*Attorney, Agent, or Firm*—Robert B. Ingraham

[57] ABSTRACT

Foamed shapes having an elongate cross-sectional configuration are prepared extruding with the major axis of the cross-sectional configuration of the die opening in a generally vertical plane, passing the extrudate to a shaping device having the desired elongate cross-sectional configuration which has its major axis in a generally horizontal plane. Improved extrusion rates are obtainable and the amount of blowing agent required to provide a given degree of expansion is reduced when compared to extrusion with the major axis of the extrusion die disposed in a horizontal plane.

4 Claims, 2 Drawing Figures

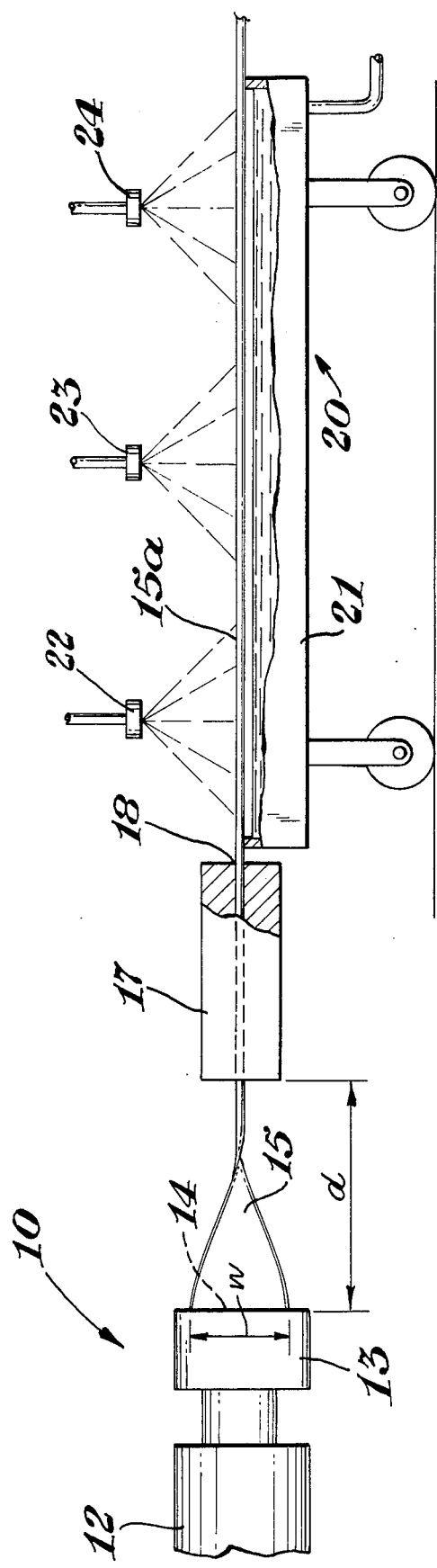
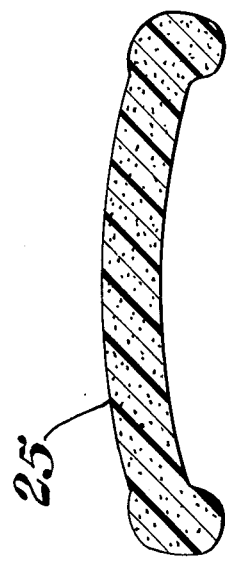

METHOD FOR THE EXTRUSION OF FOAM SHAPES

Synthetic resinous thermoplastics have become more desirable for structural shapes and the like in recent years. Traditionally, many elongate shapes have been made from wood. However, as the cost of wood has been rapidly increasing and the general quality rapidly decreasing, it has become desirable to provide elongate shapes from other materials. Synthetic resinous thermoplastics, particularly those of a cellular nature, often can be employed in applications which previously had been exclusively dominated by wood. Brittle synthetic resinous thermoplastics or plastics in solid form often are undesirable in many applications because of their brittleness and difficulty in fastening; that is, driving a common nail, frequently will cause disastrous failure. However, if a gas forming or containing material is added to the plastic and the plastic is processed to provide an article containing a plurality of gas filled cells in a volume proportion of from about 10 to as much as 95 percent, characteristics of the material appear to be significantly changed; it is no longer as brittle as the solid form and conventional fasteners such as nails and screws and the like can be employed without undesirable splitting or shattering. Usually it is desirable that the volume fraction of gas in such articles be from about 10 to 50 percent for most structural applications. Injection moldings of such foam materials are successfully prepared to acceptable dimensional tolerances. Oftentimes the most desirable way of preparing elongate articles is by continuous extrusion wherein the plastic blowing agent mixture, in heat plastified form, is extruded from a die whereupon the material foams and is shaped and dimensioned in an elongate cooling chamber having open ends.

Generally, in the extrusion of plastic of structural foam plastic shapes which have elongate cross-sectional configuration, it is desirable that the expansion occur while the extrudate is unsupported, that is, the extrudate is not peripherally restrained in a region between the extrusion die and the shaping device. Generally, the distance available for expansion is limited by the amount of sag or deflection of the extrudate due to the force of gravity acting thereon.

It would be desirable if there were available an improved method for the preparation of extruded foam articles having an elongate cross-sectional configuration.

It would also be desirable if there were available an improved method for the extrusion of foamed synthetic resinous shaped articles which required a lesser amount of blowing or foaming agent to obtain a desired degree of expansion.

It would also be desirable if there were available an improved method for the extrusion of foamed synthetic resinous articles which permitted increased production from a given piece of extrusion in some equipment.

These benefits and other advantages in accordance with the present invention are achieved in a method for the preparation of an elongate synthetic resinous thermoplastic extruded foamed article wherein a heat plastified synthetic resinous extrudable foamable composition is passed under pressure through a die, the die having an orifice, the orifice having an elongate cross-sectional configuration wherein the ratio of the major dimension of the cross-sectional configuration of the die orifice to the minor dimension thereof is at least 2 to 1, the heat plastified foamable extrudate is then passed through the die and maintained in an unconfined condition whereby the extrudate foams to form a plurality of closed gas-filled cells, the extrudate is subsequently passed to a shaping configuration, the shaping configuration having at least an extrudate receiving and shaping channel therein having a cross-sectional configuration which is an elongate and has a major to minor axes ratio of at least 2, cooling the extrudate within the shaping channel to a generally self-supporting desired configuration and subsequently cooling the resultant shaped extrudate to about ambient temperature, the improvement which comprises disposing the major axis of the extrusion orifice in a generally vertical plane while maintaining the major axis of the channel of the shaping configuration in a generally horizontal plane.

The method of the present invention may be employed with any expandable thermoplastic extrudable synthetic resinous polymer.

Expandable thermoplastic moldable polymers and copolymers (including graft copolymer products) of ar-methyl styrene or vinyl toluene, the several chlorostyrenes (such as mono- and dichlorostyrene), ar-dimethyl styrene, ar-ethyl styrene and the like, including the various thermoplastic moldable polymers and copolymers of $\alpha$-methylstyrene, may frequently be utilized with benefits commensurate to those which are derivable from employment of polystyrene. Often, this may also be the case when other expandable thermoplastic resinous materials well known to the art are employed, including those which may be comprised of polymers and copolymers of methylmethacrylate, such as its homopolymer and the copolymers thereof with vinylidene chloride; thermoplastic polymers and copolymers of vinyl chloride, including homopolymeric vinyl chloride, various thermoplastic, expandable, natural and synthetic rubber compositions; thermoplastic expandable ester and ether derivatives of cellulose including cellulose acetate, cellulose propionate, cellulose acetate butyrate, ethyl cellulose and the like, cellulose nitrate, etc.; expandable thermoplastic olefin polymers and copolymers, particularly those from nonaromatic hydrocarbon olefins, such as polyethylene, polypropylene, copolymers of ethylene and propylene and the like; chlorinated polyolefins such as chlorinated polyethylene, etc., and the like.

The blowing agents employed for the expandable thermoplastic resinous material may be any of those which are commercially utilized for such purposes, including such fugacious materials as dichlorodifluoromethane, monochlorotrifluoromethane, carbon dioxide, pentane and other low boiling hydrocarbons and other suitable materials such as heat sensitive gas generating agents (liquid or solid) including those which, upon thermal decomposition, generate nitrogen, carbon dioxide, etc. and the like. As is apparent, the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 1 and 15 weight percent or so of such fugacious materials as dichlorodifluoromethane, carbon dioxide or pentane may be employed. The fugacious or gaseous blowing agents may be incorporated into the thermoplastic material by any technique suitable for the purpose; including such known procedures as pressing a volatile or gaseous blowing agent under appropriate condition of temperature and pressure into an already prepared thermoplastic material desired to be rendered expandable, or alternatively, by including certain of such agents in the polymerization mass in which the thermoplastic polymer is prepared so as to thereby incorporate efficient amounts of the blowing agent in the polymer and directly provide an expandable product. Similar or even greater amounts (as, for example, up to 25 to 30 or so percent of such solid blowing agents as $\alpha,\alpha'$-azobisisobutyro nitrile or p,p'-oxybis benzene sulfonyl hydrazide (which generate nitrogen) and sodium carbonate (which generates carbon dioxide) are generally employed. Solid blowing agents are usually incorporated in a thermoplastic material by milling or efficient intermixing and blending procedures in order to obtain the desired expandable product.

Generally in the practice of the present invention it is desired to prepare articles having densities from about 10 to 90 percent of the density of the unfoamed polymer. For most applications utilizing structural foam the desired density is from about 30 to 80 percent of the density of the unfoamed material.

The method of the present invention is advantageously prepared in the preparation of articles having a thickness of at least about one-eighth inch and a cross-sectional configuration having a major to minor axes ratio of from about 2:1 to 20:1 and most advantageously with articles having major to minor axes ratios of 2.5:1 to about 10:1.

The method of the invention is readily applied to a wide variety of shapes including simple rectangular shapes, oval shapes, beaded edge shapes, L-shapes and is advantageously employed in the preparation of foamed synthetic resinous strips including baseboard moldings, moldings for door casings and the like.

The method of the present invention is readily applicable to any structural foam extrusion process and is not dependent upon the particular material employed. Generally, in the conventional extrusion of structural foam plastic pieces having an elongate cross-section, the die orifice and the shaping orifice are oriented in the horizontal plane.

The improvement of the present invention is obtained by rotating the die to orient the major axis of the extrusion die to a location generally in the vertical plane. The maximum benefit of the present invention is obtained when the major axis of the extrusion orifice is disposed vertically, however a substantial improvement is obtained as the die is rotated from a position where the major axis of the extrusion orifice is in the horizontal location, the improvement being generally proportional to the sine of the angle of displacement of the major axis of the extrusion orifice from horizontal plane.

FIG. 1 is a schematic representation of the process of the invention and

FIG. 2 is a cross-sectional configuration of one form of foamed plastic extrusion shape which can be successfully prepared employing the present invention.

In FIG. 1 there is schematically depicted an extrusion assembly generally designated by the reference numeral 10. The assembly 10 comprises in cooperative combination a source 12 or extruder which provides a heat plastified synthetic resinous extrudable foamable composition to an extrusion die 13. The die 13 has an extrusion orifice 14 from which issues a foaming extrude 15. The die orifice 14 has a major axis disposed in a generally vertical direction and the strip 15 has a width $w$ generally corresponding to the length of the major axes of the orifice 14. A shaping means 17 defines therein a channel 18 which has a cross-sectional configuration corresponding to that of the desired foamed plastic strip. The extrudate 15 is formed or shaped within the channel 18 to the desired configuration and cooled by cooling means not shown. The shaping means 17 is spaced from the die 13 a distance $d$ which is the distance wherein the extrudate 15 foams in an unsupported condition. Extrudate 15a issuing from the channel 18 of the shaping means 17 is passed through a cooling assembly 20 which comprises an extrudate support and liquid receiver 21 and a plurality of cooling fluid dispensing nozzles 22, 23 and 24. The nozzles 22, 23 and 24 direct the cooling fluid such as water or air onto the extrude 15a to lower the temperature thereof to a self-supporting condition and temperature below the thermoplastic temperature of the extrudate 15a.

FIG. 2 depicts a cross-sectional view of a shaped article 25, the article 25 and generally similar articles are readily prepared in accordance with the invention. Generally in the practice of the invention the distance between the die and shaping means such as the die 13 and the shaping means or shaper 17 for many polymers will be three to six times the width $w$ of the extrudate. The particular distance employed will vary with the specific shape being extruded, the particular resinous composition being extruded, the temperature of extrusion, the uniformity of the extrudate and the temperature of the ambient air. It is desirable that the shaping means be movably supported relative to the die and the distance between the die and shaping means varied once optimum extrusion conditions in the extruder have been established to provide a distance $d$ of unsupported extrude which enters the shaper freely and is not deflected sufficiently by the force of gravity that wrinkles appear on the lower surface of the extrudate leaving the shaping means.

By way of further illustration, an extrusion assembly is modified to practice the present invention, the extrusion assembly prior to modification was extruding an impact polystyrene molding strip having a configuration somewhat similar to that depicted in FIG. 2 at a rate of about 15 feet per minute (rate limited by extruder capacity). The major axes of the die and the shaping means were disposed in a horizontal plane. The maximum useable separation between die and the shaping means was about 5 inches. The feedstock to the extruder was a 5:1 by weight mixture of a commercially available impact polystyrene, that is, a polystyrene containing rubber and a commercially available styrene polymer blowing agent concentrate. Under optimum extrusion conditions the density of the product was from about 0.55 to about 0.6 gram per cubic centimeter. The die was subsequently rotated 90° to dispose the major axis of the extrusion orifice in a generally vertical direction and the distance between the die and shaper increased to about 10 inches. The proportion of impact polystyrene and blowing agent concentrate was varied to provide a part of acceptable density. At a proportion of 8 parts of impact polystyrene to 1 part of blowing agent concentrate, the extrudate density is from 0.6 to 0.65 gram per cubic centimeter. When a mixture of 5 parts of the impact polystyrene to 1 part by weight of the blowing agent was employed, excess foaming occurred.

In a manner similar to the foregoing illustration, other shapes are readily prepared from the hereinbefore delineated foamable synthetic resinous thermoplastic compositions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of an elongate synthetic resinous thermoplastic extruded foamed article wherein a heat-plastified synthetic resinous extrudable foamable composition is passed under pressure through a die, the die having an orifice, the orifice having an elongate cross-sectional configuration having a major axis wherein the ratio of the major dimension of the cross-sectional configuration of the die orifice to the minor dimension thereof is at least 2 to 1 and the foamable composition is extruded from the orifice to form a heat-plastified unsupported extrudate which foams to provide a plurality of closed gas filled cells and passing the foamed extrudate through a reshaping die having an extrudate receiving and shaping channel therein wherein the channel has a cross-section which is elongate and has a major to minor axes ratio of at least 2, cooling the extrudate within the channel to a generally self-supporting shape and subsequently cooling the resultant extrudate to about ambient temperature, the improvement which comprises extruding the extrudate with the major axis of the cross-section of the extrudate in a generally vertical plane and rotating the major axis of the extrudate to a generally horizontal plane at an entrance to the shaping channel.

2. The method of claim 1 wherein the density of the foamed extrudate is from 10 to 90 percent of the density of unfoamed foamable material.

3. The method of claim 1 where the ratio of the major dimension of the cross-sectional configuration of the die orifice to the minor dimension is from 2:1 to about 20:1.

4. The method of claim 1 where the ratio of the major dimension of the cross-sectional configuration of the die orifice to the minor dimension is from 2.5:1 to 10:1.

* * * * *